US007137293B2

(12) United States Patent
Sakagami et al.

(10) Patent No.: US 7,137,293 B2
(45) Date of Patent: Nov. 21, 2006

(54) CANISTER PROVIDED WITH A LEAK DETECTION VALVE FOR TREATING EVAPORATED FUEL

(75) Inventors: Takashi Sakagami, Hamakita (JP); Kazuya Matsuura, Hamakita (JP)

(73) Assignee: Toyo Roki Seizo Kabushiki Kaisha, Shizuoka (JP)

( * ) Notice: Subject to any disclaimer, the term of this patent is extended or adjusted under 35 U.S.C. 154(b) by 0 days.

(21) Appl. No.: 10/950,501

(22) Filed: Sep. 28, 2004

(65) Prior Publication Data

US 2005/0066717 A1 Mar. 31, 2005

(30) Foreign Application Priority Data

Sep. 30, 2003 (JP) ............................ 2003-341409

(51) Int. Cl.
*G01M 15/00* (2006.01)

(52) U.S. Cl. ...................................... 73/118.1; 73/49.7

(58) Field of Classification Search .................... 73/37, 73/40, 46, 47, 49.7, 116, 117.2, 117, 3, 118.1, 73/119 R; 123/518, 519, 520
See application file for complete search history.

(56) References Cited

U.S. PATENT DOCUMENTS

| | | | | |
|---|---|---|---|---|
| 6,640,620 | B1 * | 11/2003 | Cook et al. | 73/118.1 |
| 6,868,732 | B1 * | 3/2005 | Everingham | 73/717 |
| 6,877,381 | B1 * | 4/2005 | Everingham | 73/716 |
| 2003/0192365 | A1 * | 10/2003 | Perry et al. | 73/49.7 |
| 2004/0007135 | A1 * | 1/2004 | Ikuma et al. | 96/135 |
| 2004/0055365 | A1 * | 3/2004 | Everingham | 73/49.7 |
| 2004/0055386 | A1 * | 3/2004 | Everingham | 73/716 |
| 2004/0149016 | A1 * | 8/2004 | Kano et al. | 73/40 |
| 2005/0005689 | A1 * | 1/2005 | Veinotte | 73/112 |
| 2005/0044932 | A1 * | 3/2005 | Kano et al. | 73/49.7 |
| 2005/0044936 | A1 * | 3/2005 | Kobayashi et al. | 73/118.1 |
| 2005/0044937 | A1 * | 3/2005 | Kobayashi et al. | 73/118.1 |
| 2005/0044938 | A1 * | 3/2005 | Tsuruta et al. | 73/118.1 |
| 2005/0055144 | A1 * | 3/2005 | Steckler et al. | 701/31 |

* cited by examiner

*Primary Examiner*—Eric S. McCall
(74) *Attorney, Agent, or Firm*—Young & Thompson

(57) ABSTRACT

A canister has: a canister body including an adsorbent case which is provided with an adsorption chamber filled with an adsorbent and a fuel steam introduction port, a purge port and an air communication port which are communicated with the adsorption chamber; and a filter body. The canister body and the filter body are communicated with each other through a communication passage, in which a leak detection valve is disposed to be detachable through an end opening formed to the communication passage.

7 Claims, 5 Drawing Sheets

CANISTER PROVIDED WITH A LEAK DETECTION VALVE FOR TREATING EVAPORATED FUEL

BACKGROUND OF THE INVENTION

1. Technical Filed

The present invention relates to a canister provided with a leak detection valve.

2. Related Art

One example of a conventional canister is shown in FIG. 6.

With reference to FIG. 6, a canister is provided with a canister case 50 and a filter case 52. The filter case 52 is disposed above the upper end portion of the canister case 50 through an air (atmospheric air) communication port 51 in a vertically illustrated state. The filter case 52 is equipped with a filter element 53 for capturing or trapping dust in the air at a time of introducing the air into the filter case 52 and a leak detection valve 55. This leak detection valve 55 is disposed closely to the air communication port 55 of the canister case 50 in an air-tight manner.

In this conventional structure, since the filter case is not welded to the canister case 50, the filter case 52 is dispose detachably to the canister case 50. Accordingly, when it is required to change the leak detection valve 55, it is required to once remove the leak detection valve 55 after the removal of the filter case 52 from the canister case 50, thus being inconvenient.

Furthermore, the leak detection valve 55 is provided with at least two O-rings 56,56 to air-tightly mount the same to the filter case 52 and one O-ring 57 to be connected to the canister case 50. These O-rings 56 and 57 serve as seal members for preventing air or like from leaking. In FIG. 6, arrows show flow direction of fuel steam or outside air, for example.

As mentioned above, in the canister of the conventional structure such as shown in FIG. 6, at a time of changing or removing the leak detection valve of the canister, it is required to remove the filter case from the canister before the removal of the leak detection valve, thus being inconvenient and troublesome.

In addition, in the conventional structure, since the filter case cannot be welded to the canister case, it cannot be integrally formed with the canister case and these two members are required to be independent two parts, increasing number of parts, with much manufacturing cost in comparison with the manufacture of the integral structure. Furthermore, a working for attaching the filter case to the canister case will be required, which may adversely influence the productivity thereof.

SUMMARY OF THE INVENTION

An object of the present invention is therefore to substantially eliminate defects or inconveniences encountered in the prior art mentioned above and to provide a canister provided with a structure capable of easily mounting to or dismounting from a canister body and improved in productivity and manufacturing cost.

This and other objects can be achieved according to the present invention by providing a canister comprising:

a canister body including an adsorbent case which is provided with an adsorption chamber filled with an adsorbent and a fuel steam introduction port, a purge port and an air communication port which are communicated with the adsorption chamber;

a communication passage communicated with the air communication port of the adsorbent case;

a filter body communicated with the communication passage and provided therein with a filter element; and a leak detection valve disposed inside the communication passage to be detachable.

In a preferred embodiment, it is desired that the communication passage is formed to a side surface of the adsorbent case so that an axis of the communication passage extends horizontally, the communication passage being formed with an opening opened in the axial direction so that the leak detection valve is mounted to or dismounted from the communication passage through the opening thereof. The communication passage may have an end portion near the opening having an inward tapered structure. The opening has a size larger than an outer periphery of the leak detection valve.

The canister body may include two tubular members which is formed as first and second adsorption chambers, respectively, so as to be communicated with each other, which is filled with an adsorbent, and the communication passage is formed along the second tubular member.

The filter body may include first and second dust filter sections communicated with each other and the first dust filter section includes the filter element therein. The filter body can be integrally formed with the canister body.

Furthermore, the communication passage may be provided with support members for supporting the leak detection valve disposed inside the communication passage through sealing members.

It is preferred that canister may be mounted to a vehicle body to be detachable in a horizontal direction.

According to the canister of the present invention of the characters mentioned above, the leak detection valve once mounted to the canister can be easily dismounted therefrom through the communication passage formed to the canister. Moreover, the filter case can be integrally formed with the canister case, which can lead to reduce parts or elements constituting the canister, thus being available for manufacture.

The nature and further characteristic features of the present invention will be easily understood from the following descriptions made with reference to the accompanying drawings.

DESCRIPTION OF THE PREFERRED EMBODIMENT

Figure 1:
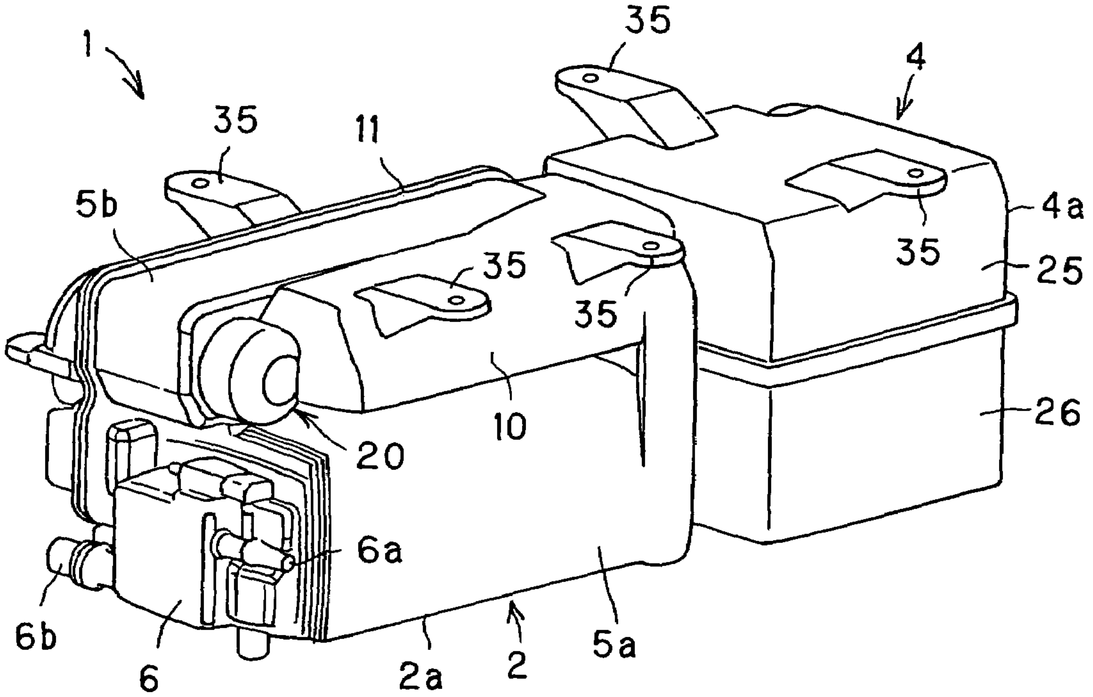
FIG. 1 is a perspective view showing an outer appearance of a canister according to one preferred embodiment of the present invention.

A preferred embodiment of a canister according to the present invention will be described hereunder with reference to the accompanying drawings.

The canister of the present invention is a device preferably to be mounted to a vehicle such as automobile provided with an internal combustion engine and adapted to treat fuel steam generated in a fuel supply source, i.e., fuel tank. Further, it is to be noted that the terms indicating “direction” such as “upper”, “lower”, “right”, “left” and the like are used herein with reference to the illustration of the canister shown in FIG. 3, but they should not be limited to the directions in the actual use of the canister.

With reference to FIGS. 1 to 4, a canister 1 of the present invention comprises a canister body (main body of the canister) 2 and a filter unit 4 connected to the canister body 2 through a communication passage 15 the 5. The filter unit includes a first filter 31 serving as a main filter and a second filter 4 serving as an auxiliary (sub-) filter.

The canister body 2 is provided with an adsorbent case 2*a* made of resin, and the adsorbent case 2*a* is composed of a case body 5 having a pair of lateral tubular members 5*a* and 5*b*, a top cap mounted to one end (upper end as viewed in FIG. 3) wall section of the tubular member 5*a* and a lid 7 mounted to another one end (lower end as viewed in FIG. 3) wall section of the case body 5.

The top cap 6 is joined air-tightly onto one tubular member 5*a* of the case body 5 at its entire peripheral portion, and the lid 7 is also joined onto the case body 5 at its entire peripheral portion. Such joining is performed through fusing process. Further, referring to FIG. 3, the tubular members 5*a* and 5*b* are composed of a substantially rectangular upper wall section and four plates of side wall sections extending vertically from the peripheral portion of the upper wall section. The bottom portions of these tubular members 5*a* and 5*b* are commonly formed by the lid 7.

With the case body 5, one of the tubular members 5*a* acts as a first adsorption chamber 9 filled with an adsorbent 8, and on the other hand, the other one tubular member 5*b* also acts as a second adsorption chamber 10 filled with an adsorbent 8.

The second adsorption chamber 10 is formed, at its upper end portion, with a port communicating with the atmosphere (communication port) 10*c* opened in a direction normal to the axial direction of the second adsorption chamber 10.

The tubular member 5*b* is formed, at its upper portion, with a communication passage 15 communicating the communication port 10*c* of the second adsorption chamber 10 and the filter chamber 11. This communication passage 15 is formed along the side wall section of the tubular member 5*a*. The communication passage 15 has one end connected to the communication port 10*c* and the other end connected to the first dust filter 31.

The first dust filter 31 is arranged side by side with the tubular member 5*b* acting as the second adsorption chamber 10 on the side of the tubular member 5*a* acting as the first adsorption chamber 9. The first dust filter 31 has a filter chamber 11 provided with a rectangular filter element 11*a* having vertically gusset shape and a passage 3 through which air passing through the filter chamber 11 is guided to the second dust filter 4. This passage 3 is disposed so as to extend downward from the lower end portion of the first dust filter body 31.

Furthermore, the filter chamber 11 is formed, at its one end surface, with a connection port, not shown, communicated with the communication passage 15. The filter element 11*a* is disposed inside the filter chamber 11 in a fixed state or detachable state. The above-mentioned connection port for the communication passage 15 and the passage for the second dust filter body 4 are communicated with each other with the filter element 11*a* interposed therebetween. The second adsorption chamber 10 and the filter chamber 11 (i.e., dust filter body 31) are also communicated with each other through the inner space of the communication passage 15 to thereby permit the air and/or fuel steam to pass through both the chambers 10 and 11. Further, an activated carbon is generally utilized for the adsorbent 8, which however is not limited thereto.

The case body 5 is formed, at its lower end portion, with a communication portion 12 through which the first and second adsorption chambers 9 and 10 are communicated with each other to thereby permit the air and/or fuel steam to pass between both the chambers 9 and 10.

Figure 3:
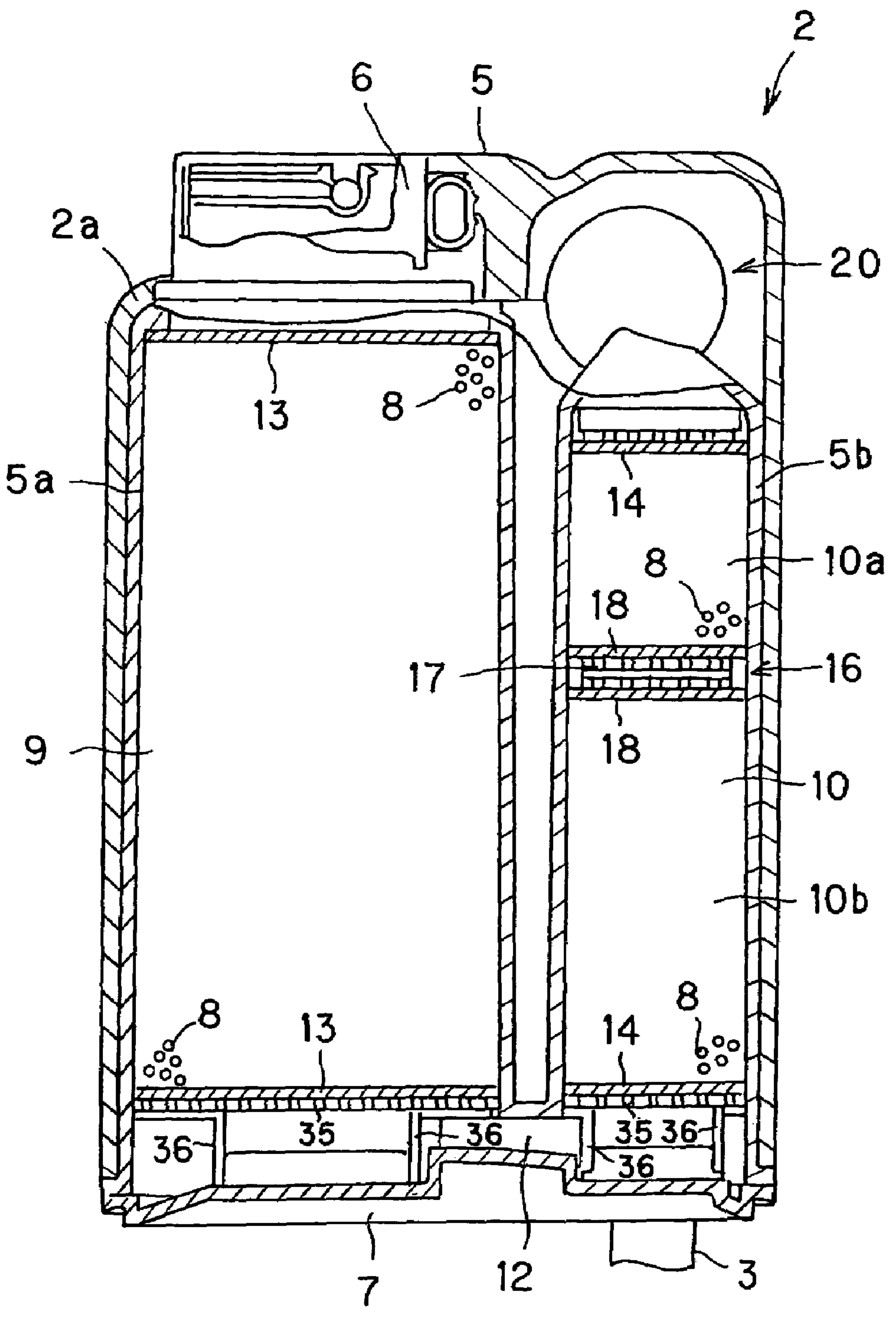
FIG. 3 is a sectional view taken along the line III—III in FIG. 2.

Furthermore, as shown in FIG. 3, upper and lower filters 13, 13 and 14, 14, each in form of sheet, are mounted to both the vertical end portions of the first and second adsorption chambers 9 and 10, respectively, and the adsorbent 8 such as activated carbon fills an inner space of the adsorption chambers 9 and 10 between the filters 13, 13 (14, 14) so as to form an adsorbent layer therein. In a preferred example, a felt in form of sheet will be utilized as such filters 13 and 14.

Grids 35, 35 are disposed below the lower filter 13 and the lower filter 14, respectively. The grid 35 is formed with a number of through holes extending in the axial direction of the case body 5. Coil springs 36, 36 are disposed to the lower portions of the grids 35, 35, respectively, and a lid 7 is fixedly applied so as to cover the lower side end portions of the coil springs 36, 36 and compress the same upward. According to reactive force of the coils in the upper direction, the grids 35, 35 are pressed upward to thereby somewhat coagulate the activated carbon (i.e., adsorbent 8) of the adsorbent layer so as to provide a suitable solid state. A space is formed between the grids 35 and the lid 7 as a communication passage 12 having a predetermined thickness. Further, this lid 7 serves as the bottom wall section of the case body 5.

With reference to FIG. 3, a hollow pipe, not shown, is mounted to the top cap 6 at the upper end portion of the tubular member 5*a* so as to communicate the top cap 6 and the first adsorption chamber 9 with each other.

Figure 2:
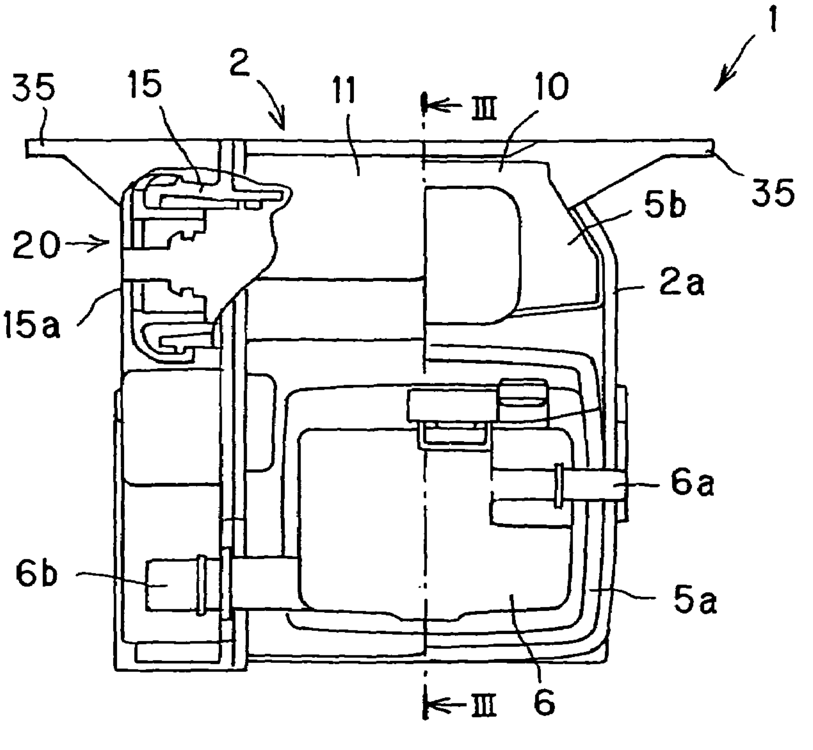
FIG. 2 is a side view of a main body of the canister of FIG. 1.

As also shown in FIG. 2, the top cap 6 is provided with a charge port 6*a*, as a fuel steam introduction port, which is connected to a hose communicating with the fuel tank and a purge port 6*b* which is connected to an intake system of the internal combustion engine of a vehicle such as automobile. Thus, the charge port 6*a* and the purge port 6*b* are communicated with each other through the first adsorption chamber 9 and a hollow pipe, not shown, to thereby permit the air and/or fuel steam to flow. Further, a P sensor, as a pressure detection sensor, for detecting a pressure variation at a time of air-leak check may be provided for the top cap 6.

Inside the second adsorption chamber 10, is provided an intermediate wall section 16 at an intermediate position in the height direction thereof as shown in FIG. 3 so as to divide the second adsorption chamber 10 into two vertical sections 10*a* and 10*b*. The intermediate wall section 16 comprises a grid 17 formed with a number of vertical through holes and filters 18, 18 each in form of sheet so as to closely contact to the upper and lower surface sides of the grid 17.

Figure 4:
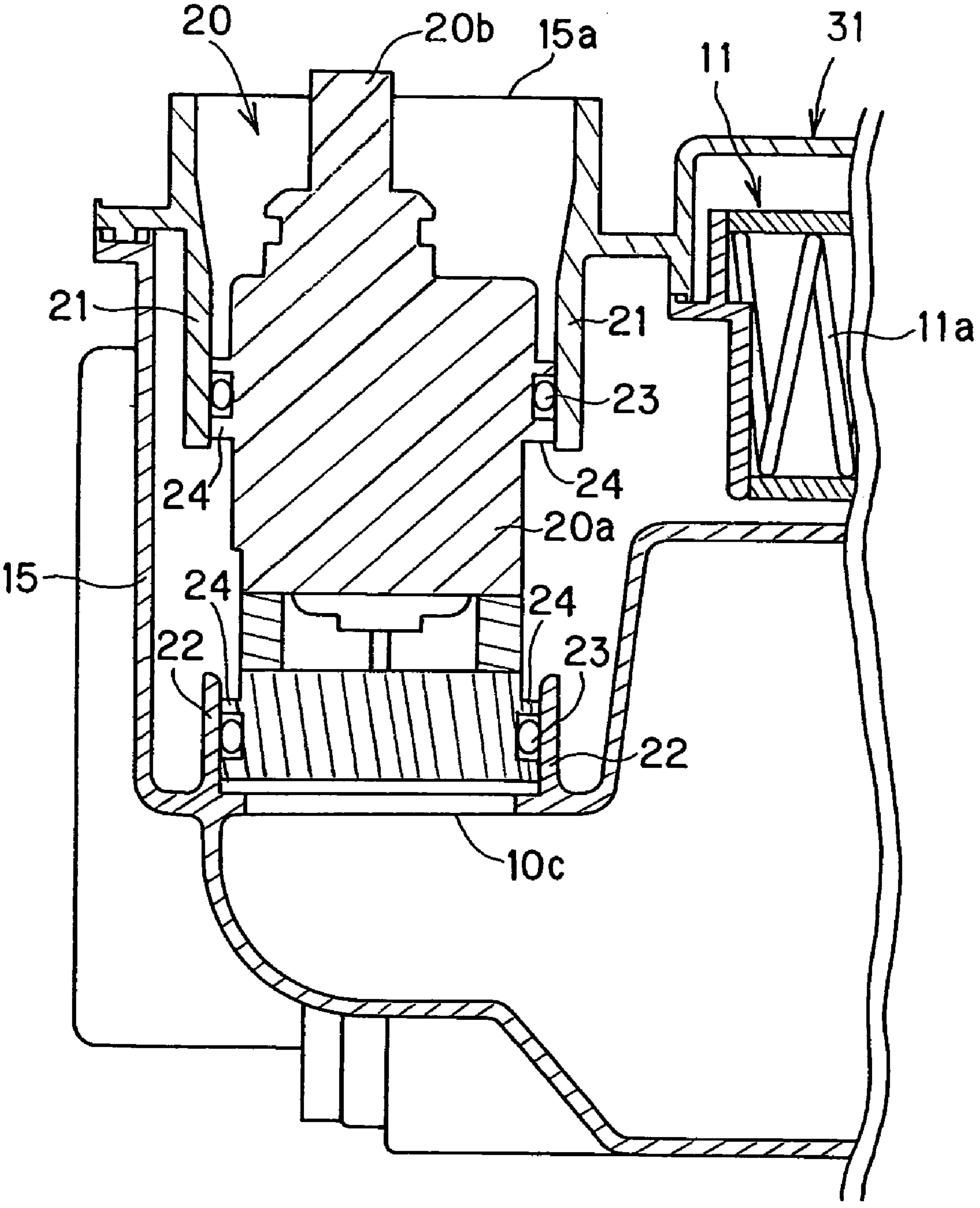
FIG. 4 is a sectional view showing an arrangement of one example of a leak detection valve provided for the canister of the present invention.

With reference to FIG. 4, the communication passage 15 is provided with a leak detection valve 20. The leak detection valve 20 is provided with a tubular valve body 20*a* and a connector 20*b* for an electrical contact provided for one end of the valve body 20*a*. The communication passage 15 has an opening 15*a* opened in a direction normal to the axis of the case body 2 (horizontal direction). The upper end portion, near the opening 15*a*, of the of the communication passage 15 is formed to provide an inwardly reduced tapered surface (taper structure). According to such inward taper structure having a widely opened side of the opening 15*a*, the leak detection valve 20 can be easily mounted to the communication passage 15 from the opening side thereof, thus being available for easy maintenance, and in addition, damage of an O-ring 23, mentioned hereinlater, which will be caused through scrubbing to a support member 21, will be weakened.

Moreover, inside the communication passage 15, are disposed the support member 21 for securing the outer peripheral upper portion of the leak detection valve body 20*a* and a support member 22 for fixing the outer peripheral lower portion of the lead detection valve body 20*a*. These support members 21 and 22 have tubular or cylindrical structures and are disposed so as to correspond to the locating positions of the leak detection valve 20. Further, the support member 22 is disposed at a lower end portion of the communication passage 15.

The leak detection valve 20 is inserted into the communication passage 15 through the opening 15*a* and mounted therein in the manner that the connector 20*b* is positioned on the opening 15*a* side.

Further, the canister 1 is mounted to a vehicle in a horizontal state, so that the leak detection valve 20 can be dismounted from the canister 1 by pulling it horizontally outside through the opening 15*a*. O-rings 23, 23, having elasticity, and a pair of supports 24, 24 supporting the O-rings 23, 23 are mounted to the upper and lower outer peripheral portions of the lead detection valve body 20*a* so as to keep air-tightness from the support members 21 and 22 disposed in the communication passage 15, thus the O-rings 23, 23 serving as seal members. According to this structure, the leak detection valve 20 can be mounted in close and tight contact to the support members 21 and 22. More specifically, the leak detection valve 20 is mounted closely and air-tightly to the opening 15*a* and to the end portion of the second adsorption chamber 10 so as to effectively prevent the air from leaking outward.

At the time of mounting the leak detection valve 20 to the case body, the valve body 20*a* of the leak detection valve 20 is inserted inside the communication passage 15 through the opening 15*a* thereof. In this mounting operation, the O-rings 23 acting as sealing members provided at the outer peripheral portion of the valve body 20*a* tightly contact the support members 21 and 22 to prevent the leak detection valve 20 from coming off from the communication passage 15. On the other hand, when it is required to remove the leak detection valve 20, it can be easily dismounted from the communication passage 15 by pulling it outward through the opening 15*a*.

The second dust filter 4 is connected to the passage 3 firmly by means of fusing, for example, or detachably. The second dust filter 4 has a filter case 4*a* having one end to which a connection port for the passage 3 is formed and another end to which an external air introduction port is formed so as to communicate with atmosphere. This filter case 4*a* is composed of upper and lower halves 25 and 26 as upper and lower lids, which may be fused to each other or assembled detachably. Inside the filter case 4*a*, fin-shaped filter element, not shown, is disposed in a fixed or detachable manner. In this structure, the connection port for the passage 3 is formed to a predetermined portion, not shown, of the upper case 25 and the air introduction port 26 is, on the other hand, is formed to a predetermined portion, not shown, of the lower case half 26. Thus, both the connection port and air introduction port are communicated with each other through the inside of the filter case 4*a* through the filter element, not shown.

Furthermore, a plurality of fixing or fastening members or fittings 35 are provided for the tubular member 5*b* of the case body 2*a* and the outer peripheral portion of the dust filter body 4 for the purpose of being connected to another member or structure such a vehicle component. The canister 1 of the present invention will be fixed or fastened to, such as, vehicle body by means of bolts, screw or like through these fixing members 35.

Figure 5:
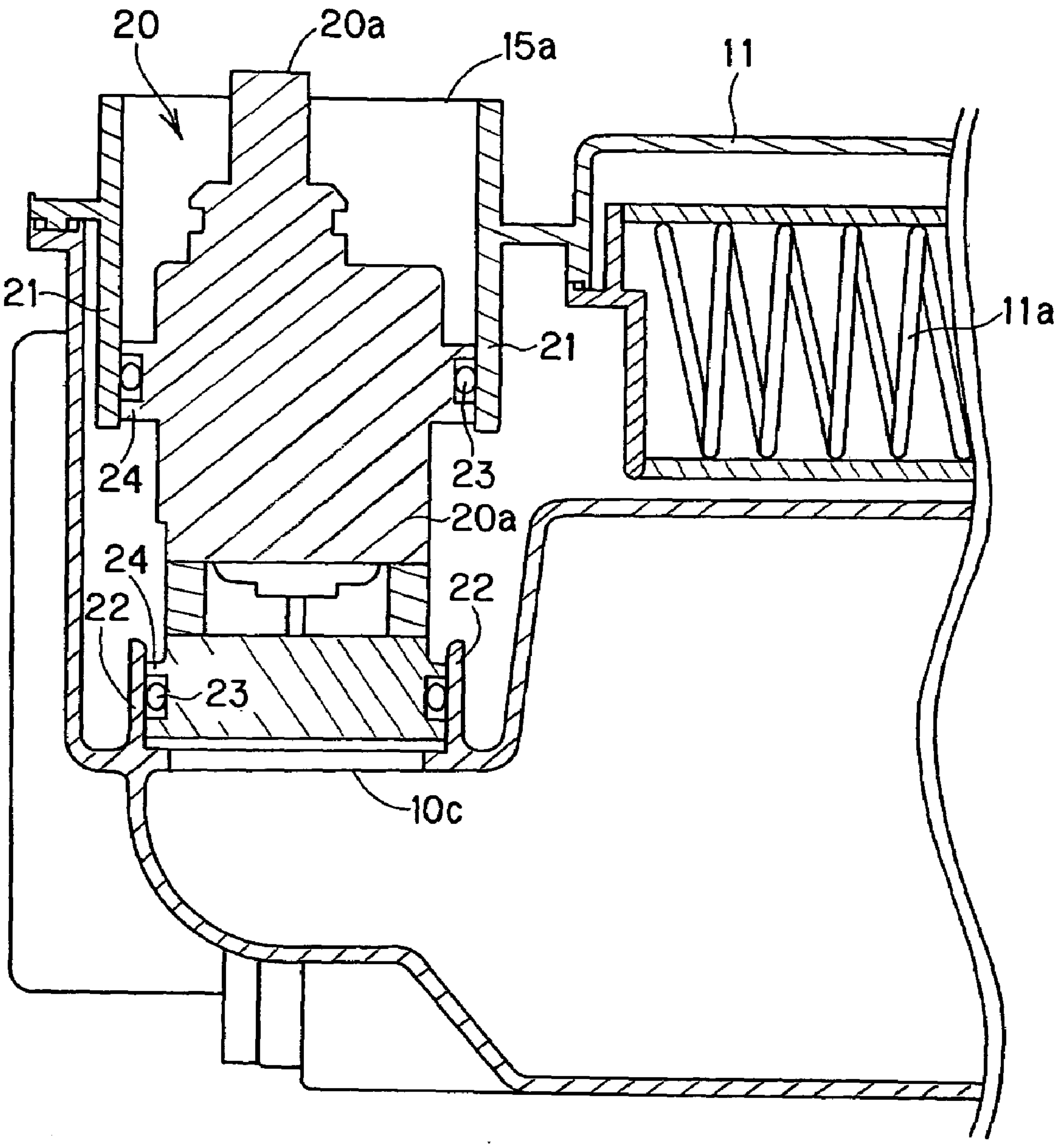
FIG. 5 is a sectional view of an arrangement of another example of the leak detection valve provided for the canister of the present invention.
Figure 6:
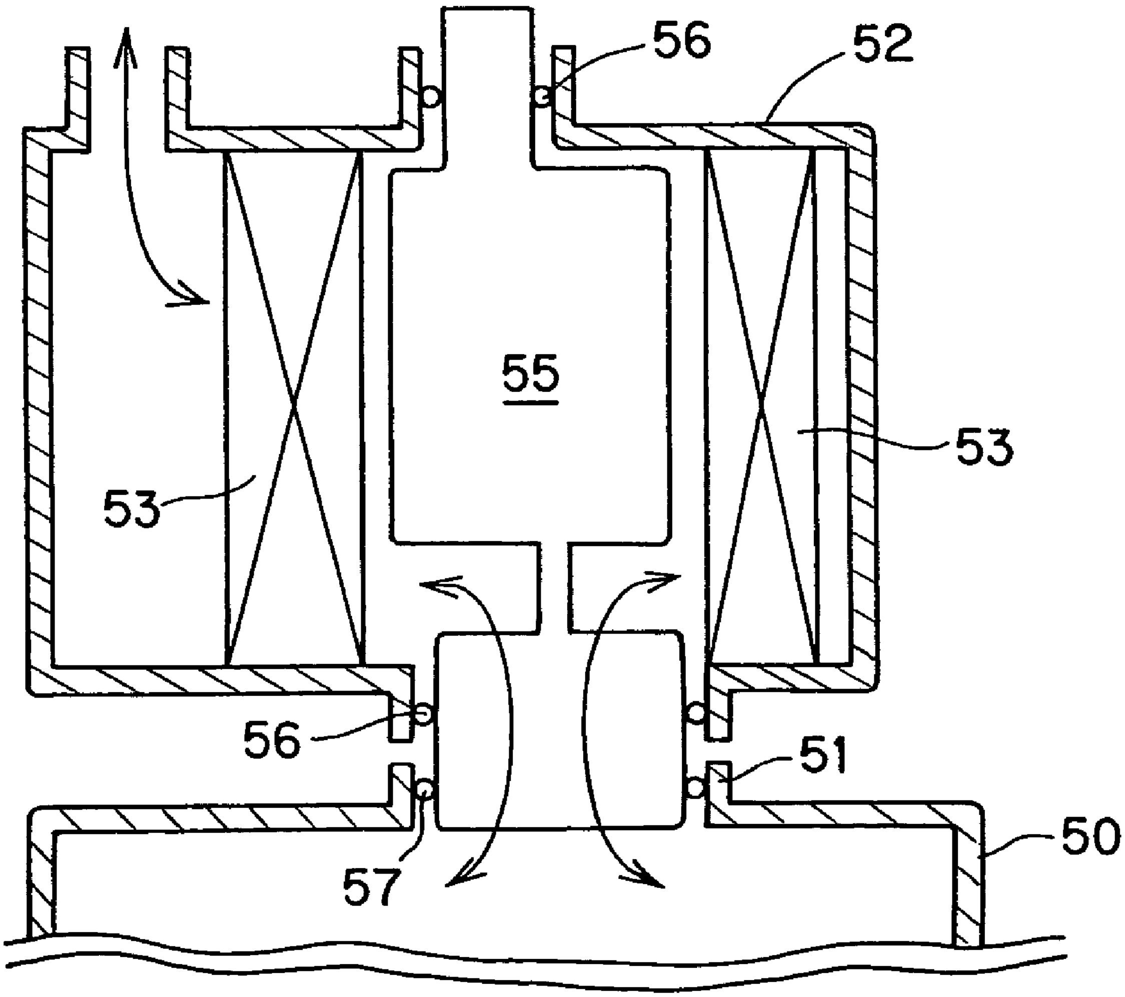
FIG. 6 PRIOR ART
FIG. 6 is a sectional view of a canister of a conventional structure.

In addition, as shown in FIG. 5, the opening 15*a* of the communication passage 15 may be formed in conformity with the outer size or dimension of the leak detection valve body 20*a*, and the support members 21 and 22 for supporting the peripheral portion of the leak detection valve 20 may be also formed to have a tubular shape in conformity with the outer dimension of the leak detection valve 20. According to such structure, the support members can be easily manufactured, leading to reduction of cost.

As mentioned hereinbefore with reference to the accompanying drawings, the canister 1 of the present invention includes: the adsorbent case 2*a* provided with the first and second adsorption chambers 9, 10 which is filled with the adsorbent, the fuel steam introduction port 6*a* and the purge port 6*b* both communicated with the first adsorption chamber 9, the air (atmosphere) communication port 10*c* communicated with the second adsorption chamber 10; the communication passage 15 communicated with the air communication port 10*c*; the dust filter bodies 31, 4 communicated with the communication passage 15 and provided therein with the filter element 11*a*; and the leak detection valve 20 mounted to be detachable to the communication passage 15.

Furthermore, in the above structure of the canister 1, it is desired that the communication passage 15 is mounted to the side surface of the adsorbent case 2*a* so as to have the opening 15*a* opened in the axial direction thereof to thereby insert or take out the leak detection valve 20 horizontally through the opening 15*a*. The end portion of the communication passage 15 near the opening 15*a* may have a tapered shape to ensure the smooth insertion of the leak detection valve 20, which is mounted in the air-tight manner to the inner surface of the communication passage 15 by means of seal members preferably of O-rings 23.

The canister 1 may be mounted to, for example, the vehicle in a manner that the leak detection valve 20 is detachable in the horizontal direction.

It is further noted that the present invention is not limited to the described embodiment and many other changes and modifications may be made without departing from the scopes of the appended claims.

The entire disclosure of Japanese Patent Application No. 2003-341409 filed on Sep. 30, 2003 including the specification, claims, drawings and summary is incorporated herein by reference in its entirety.

What is claimed is:

1. A canister comprising:

a canister body including an adsorbent case which is provided with an adsorption chamber filled with an adsorbent and a fuel steam introduction port, a purge port and an air communication port which are communicated with the adsorption chamber;

a communication passage having an opening arranged at the end of the adsorbent case and communicated with the air communication port of the adsorbent case;

a filter body arranged inside the adsorbent case and communicated with the communication passage and provided therein with a filter element; and a leak detection valve disposed inside the communication passage to be detachable, wherein the leak detection valve is inserted into the communication passage through the opening and the two points of its axial direction are supported inside the communication passage through sealing members.

2. A canister according to claim 1, wherein said communication passage is formed to a side surface of the adsorbent case so that an axis of the communication passage extends horizontally, said communication passage being formed with an opening opened in the axial direction so that the leak detection valve is mounted to or dismounted from the communication passage through the opening thereof.

3. A canister according to claim 2, wherein said communication passage has an end portion near the opening having an inward tapered structure.

4. A canister according to claim 3, wherein said opening has a size larger than an outer periphery of the leak detection valve.

5. A canister according to claim 1, wherein said canister body includes two tubular members which are formed as first and second adsorption chambers, respectively, so as to be communicated with each other, which are filled with an adsorbent and said communication passage is formed along the second tubular member.

6. A canister according to claim 1, wherein said filter body includes first and second dust filter sections communicated with each other and said first dust filter section includes the filter element therein.

7. A canister according to claim 1, wherein said canister is a canister for a vehicle to which the canister is mounted detachably in a horizontal direction.

* * * * *